Figure 1:
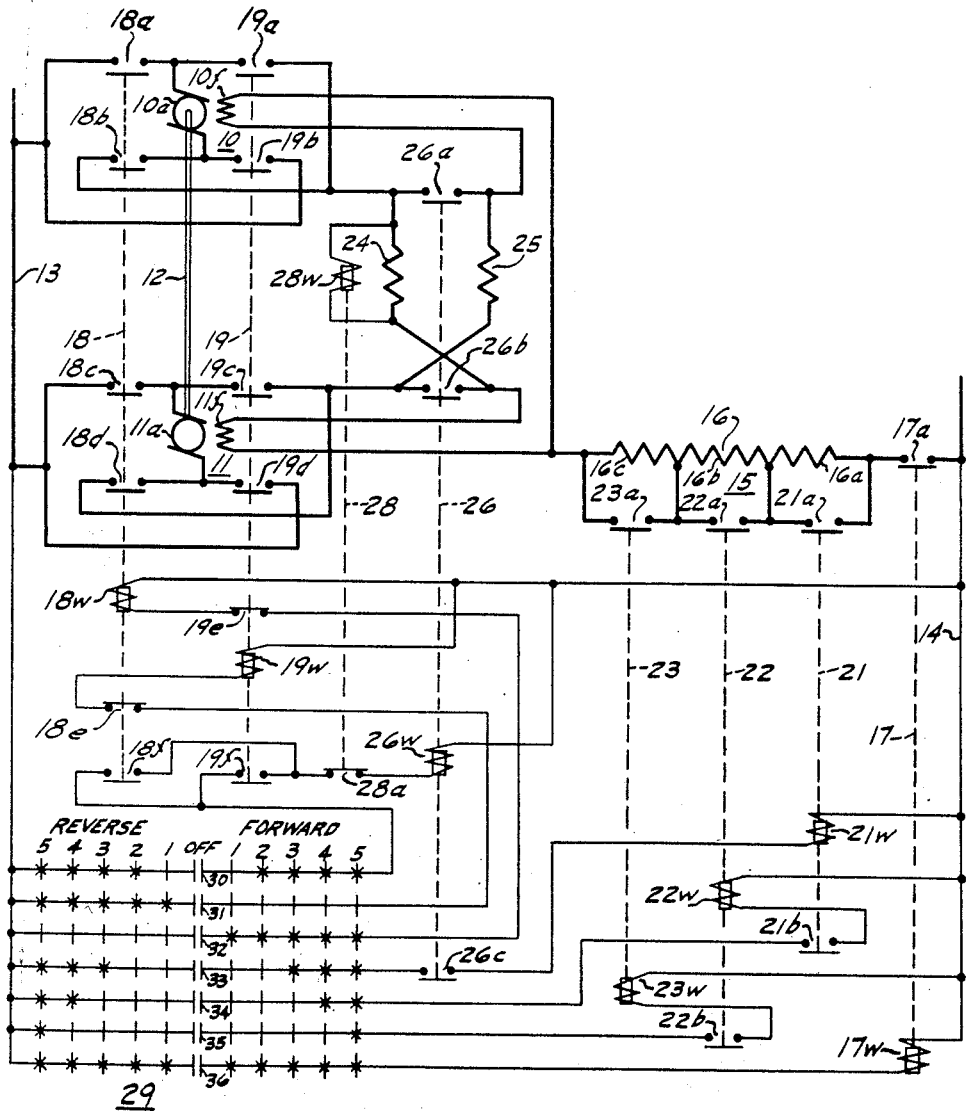

INVENTOR.
ASA H. MYLES

United States Patent Office 2,784,360
Patented Mar. 5, 1957

2,784,360

CONTROL SYSTEM FOR, AND A METHOD OF, CONTROLLING A PLURALITY OF DIRECT CURRENT MOTORS

Asa H. Myles, Solon, Ohio, assignor, by mesne assignments, to Square D Company, Detroit, Mich., a corporation of Michigan Application December 8, 1954, Serial No. 473,842

10 Claims. (Cl. 318—63)

This invention relates to a control system for, and a method of, controlling a plurality of direct current motors, and more particularly to a control system for, and a method of, controlling a plurality of mechanically-coupled, direct current, series or compound motors which cause the motors to operate in parallel with substantially no tendency for any motor to take more than its share of the load while the motors are running in the direction of their torques as well as while the motors are being plugged.

Two or more mechanically-coupled, direct current, series or compound motors are often operated in parallel with each other for applications requiring that the motors be frequently stopped or reversed by plugging. In order to reduce the cost and size of the controller, it is desirable to use a common acceleration and speed controlling rheostat for the motors instead of a separate rheostat for each motor. When the motors are in parallel, the series field of each motor is in series with its own armature, and the closed loop or loops so formed are connected across a power source in series with a common rheostat of which the resistor portion is excluded as the motor accelerates, the motors divide the load satisfactorily during acceleration and at all other times when running in the direction of their torques but tend to become unstable upon plugging.

Considering two substantially identical motors connected as just described, any tendency for the first motor, for example, to take more current and consequently to assume more of the load than the second motor while the motors are running in the direction of their torques results in an increase in the field strength of the first motor. This increased field strength of the first motor causes an increase in the counter-electromotive force of the first motor with a resultant decrease in the current of the first motor. Thus, stability results and the load is always divided satisfactorily between the motors. Upon plugging, however, a different situation exists. Any tendency for the first motor to take more current than the second motor during plugging again results in an increase in the counter-electromotive force of the first motor, but now the current is flowing in the direction of the counter-electromotive force, and the increased counter-electromotive force causes the current of the first motor to increase further. Thus the load often is not divided satisfactorily, a large circulating current can flow in the loop circuit, and the system is unstable.

If the series fields of the motors are cross-connected so that the field of the first motor is in series with the armature of the second motor and the field of the second motor is in series with the armature of the first motor, the instability tends to occur while the motors are running in the direction of their torques but cannot occur during plugging.

This tendency toward instability of parallel connected series or compound motors has been eliminated previously by connecting the armatures of two motors in parallel to form a closed loop and the series fields of the motors in series with each other and with the loop. This prior control system has the disadvantage, however, that each series field must have adequate thermal capacity to carry the armature current of both motors thus requiring the use of special motors if the motors are to be worked at their full capacities.

Another attempt to solve the problem has been to divide the plugging resistor into parts connected in series with the respective motors within the loops. Although this so increases the resistance of the loops during plugging that the circulating currents do not become excessive, load unbalance is not eliminated, particularly under this most severe operating condition.

The best control system known in the prior art for solving the problem is one which keeps the series field and armature of each motor in series with each other at all times and provides each motor with its own accelerating and plugging resistors. This insures proper operation under all conditions. The principal disadvantage of this prior system is that a large number of contactor poles is required resulting in a large and expensive controller.

It is an object of this invention to provide an improved control system for, and method of, operating a plurality of direct current, series or compound motors in parallel.

A further object is to provide an improved control system for, and method of, operating a plurality of mechanically-coupled, direct current, series or compound motors in parallel which system and method eliminate any tendency toward load unbalance between the motors while plugging and substantially eliminate any tendency toward load unbalance while the motors are running in the direction of their torques.

Another object is to provide an improved control system for, and method of, operating a plurality of mechanically-coupled, direct current, series or compound motors in parallel which system and method eliminate any tendency toward load unbalance between the motors while plugging and while the motors are running in the direction of their torques after the plugging resistor is excluded.

A more specific object is to provide a control system for, and method of, operating a plurality of mechanically-coupled, direct current, series or compound motors in parallel in which system and method the series fields of the respective motors are in series with their own armatures, respectively, while the motors are running in the direction of their torques and are in series with the armatures of others of the motors, respectively, during plugging.

In accordance with this invention, as applied to two mechanically-coupled, direct current, series or compound motors, an acceleration and speed controlling rheostat is in series with a loop circuit including the armatures and the series fields of the motors. A two-pole plugging switch when closed connects each of the series fields in series with its own armature. Opening of the contacts of the plugging switch disconnects the armatures from their own respective series fields, concurrently causes the series fields of the motors to be cross-connected, and causes plugging resistor sections to be connected in series with the armtaures, respectively.

Similar connections are controlled by a plugging switch when more than two motors are used, the series of field of each motor, which is connected in series with its own armature, being disconnected from its own armature and cross connected to the armature of one of the other motors by operation of the plugging switch.

Figure 2:
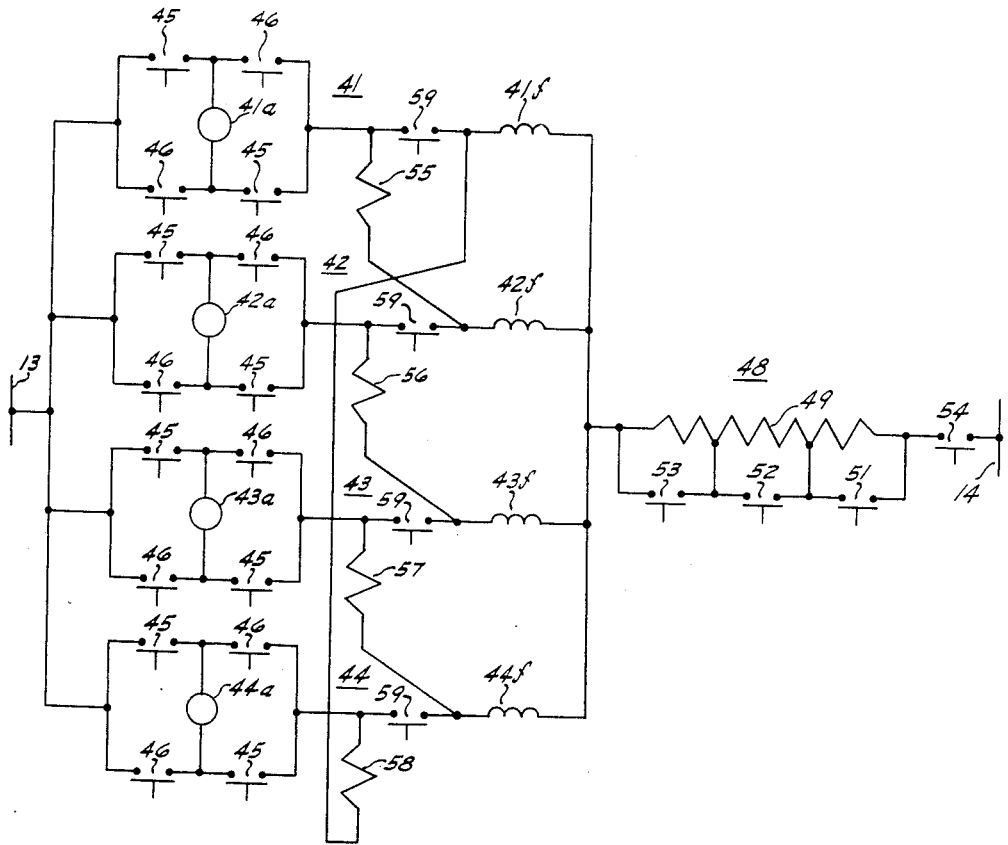

Further objects and advantages of this invention will become apparent from the following description wherein reference is made to the drawings, in which:

Figure 1 is a wiring diagram of a magnetic controller embodying the control system and employing the method of this invention; and Figure 2 is a wiring diagram in elementary form showing the invention as applied to the control of four motors.

Although the control system is described as embodied in a magnetic controller, it is to be understood that the control system can be embodied in a manual controller as well, and that the method of control can be utilized in either type of controller or modifications thereof.

Referring to Figure 1, a direct current motor 10 having an armature winding 10a and a series field winding 10f is arranged to be connected for parallel operation with a similar motor 11 having an armature winding 11a and a series field winding 11f. Although series motors are shown in the drawings, it is obvious that the motors may have, in addition to their respective series fields, respective shunt fields supplied in any suitable and well known manner.

The motors 10 and 11 are shown as being mechanically coupled to each other by a shaft 12 extending between the armatures 10a and 11a. It will be understood that the tie between the motors can be any means causing the motors to run at substantially the same speed or at speeds of substantially fixed relation. For example, one of the motors may be geared to drive track wheels at one end of a crane bridge and the other may be geared to drive track wheels at the opposite end of the bridge.

Power is supplied to the motors 10 and 11 from a suitable source of direct current, indicated by the conductors 13 and 14, through a common acceleration and speed controlling rheostat 15 comprising a resistor 16 having series connected sections 16a, 16b, and 16c which, in a manner to be described, are short-circuited in sequence to cause the motors to accelerate to full speed and are selectively short-circuited for speed control.

The left hand end of the resistor 16 is connected to the series fields 10f and 11f and the right hand end is selectively connected to and disconnected from the power conductor 14 by a single-pole electromagnetic contactor 17 having normally open power contacts 17a and an operating winding 17w. The direction of rotation of the motors 10 and 11 is determined by selective operation of a pair of four-pole electromagnetic reversing contactors 18 and 19 which reversably connect the armatures 10a and 11a to the conductor 13 and to the fields 10f and 11f. The contactor 18 is the forward contactor and has four normally open power contacts 18a, 18b, 18c, and 18d, an operating winding 18w, normally closed control contacts 18e, and normally open control contacts 18f. The contactor 19 is the reverse contactor and has normally open power contacts 19a, 19b, 19c, and 19d, an operating winding 19w, normally closed control contacts 19e, and normally open control contacts 19f.

Control of the acceleration and speed of the motors 10 and 11 is provided by a plurality of single-pole electromagnetic acceleration contactors 21, 22, and 23 forming part of the rheostat 15 and having operating windings 21w, 22w, and 23w, respectively, and normally open power contacts 21a, 22a, and 23a, respectively. The contactors 21 and 22 also have normally open control contacts 21b and 22b, respectively. The power contacts 21a, 22a, and 23a, when closed, short circuit the resistor sections 16a, 16b, and 16c, respectively.

Plugging resistors 24 and 25 are arranged to be connected in series with the respective armatures 10a and 11a to limit the current in the motors while the motors are being plugged. The connection of the resistors 24 and 25 is controlled by a double-pole electromagnetic plugging contactor 26 having normally open power contacts 26a and 26b, an operating winding 26w, and normally open control contacts 26c. When one of the contactors 18 or 19 is closed and the contactor 26 is open, the field 10f is connected in series with the resistor 25 and the armature 11a, and the field 11f is connected in series with the resistor 24 and the armature 10a. Upon closure of the plugging contactor 26, the field 10f is connected in series with the armature 10a, the field 11f is connected in series with the armature 11a, and the resistors 24 and 25 are no longer effective in the circuit.

The closure of the plugging contactor 26 may be controlled manually or by any suitable one of the many plugging control means well known in the art. As shown, an electromagnetic relay 28 having an operating winding 28w connected across one of the plugging resistors, shown as the resistor 24, is provided for this purpose. The relay 28 has normally closed contacts 28a.

Selective operation of all of the contactors is controlled by a multi-position, reversing master switch 29 having contacts 30 through 36. The contacts 30 through 36 are open in the off position of the master switch and are also open in all other positions except as closure thereof is indicated by crosses aligned with the respective contacts. For example, the contacts 33 are open in the off position and in the first two forward and reverse positions, but are closed in the last three forward and reverse positions.

Acceleration of the motors 10 and 11 from rest in the forward direction will now be described. When the master switch 29 is in the off position, all of the contactors are in their normal deenergized or open positions as shown in the drawing. Upon movement of the master switch to the first forward position, the contacts 32 and 36 close. The closure of the contacts 36 completes a circuit from the supply conductor 13 through the operating winding 17w to the conductor 14. The contactor 17 thereupon closes its power contacts 17a to connect the right hand end of the resistor 16 to the conductor 14. The closure of the contacts 32 completes a circuit from the conductor 13 through the now closed control contacts 19e and the winding 18w to the conductor 14. The contactor 18 thereupon closes its power contacts 18a, 18b, 18c, and 18d to connect the armatures 10a and 11a for operation of the motors 10 and 11 in the forward direction. The circuit including the armature 10a of the motor 10 is from the conductor 13 through the power contacts 18a, the armature 10a, the power contacts 18b, the plugging resistor 24, the series field winding 11f of the motor 11, the resistor 16, and the power contacts 17a to the conductor 14. The circuit including the armature 11a of the motor 11 is from the conductor 13 through the power contacts 18c, the armature 11a, the power contacts 18d, the plugging resistor 25, the series field winding 10f of the motor 10, the resistor 16, and the power contacts 17a to the conductor 14.

A closed loop is thus formed including the armatures 10a and 11a, the fields 10f and 11f, and the resistors 24 and 25. The motors 10 and 11 are connected to the source in parallel with each other with their series fields cross-connected and accelerated from rest in the direction of their torques. There is with this connection, as previously described, a tendency for the motors to become unbalanced, but deleterious unbalance is prevented by the resistors 24 and 25 which limit to a low value any circulating current in the loop circuit, and by the resistor 16 which, in conjunction with the resistors 24 and 25, prevents the motors from accelerating beyond a very slow speed.

The voltage drop across the resistor 24 is too small to cause operation of the relay 28 when the motors are accelerating from rest. Upon movement of the master switch 29 to the second forward position, an operating circuit for the plugging contactor 26 is completed through the contacts 30, the now closed contacts 18f, and the contacts 28a. Consequent closure of the plugging contactor 26 connects the series field 10f of the motor 10 in series with the armature 10a and the series field 11f of the motor 11 in series with the armature 11a. Each series field is now connected in series with its own armature and stable operation results during subsequent acceleration and so long as the motors continue to run in the direction of their torques. The resistors 24 and 25 are now connected in parallel with each other between equi-potential or substantially equi-potential points of the circuits of the two motors and carry no current or substantially no current.

When the master switch is moved through the third and fourth positions and into the fifth position in the forward direction, the contacts 33, 34, and 35 close in sequence to cause sequential energization of the windings 21w, 22w, and 23w. The contactors 21, 22, and 23 thus operate to short circuit in steps the respective resistor sections 16a, 16b, and 16c causing the motors to accelerate to full speed. The circuit to the operating winding 21w is through the contacts 33 and the control contacts 26c, the circuit to the operating winding 22w is through the contacts 34 and the control contacts 21b, and the circuit to the winding 23w is through the contacts 35 and the control contacts 22b. The control contacts 18f, 26c, 21b, and 22b thus function as electrical interlocks to insure that the contactors 26, 21, 22, and 23 operate in the desired sequence. As is well known in the art, acceleration relays (not shown) may be included to delay the closure of one or more of the contactors 21, 22 and 23.

Return of the master switch 29 from the fifth forward position to the off position causes deenergization and opening of the contactors 17, 18, 21, 22, 23 and 26 so that all of the power contacts are open. If the master switch 29 remains in the off position, the motors 10 and 11 coast to a standstill.

With the motors 10 and 11 at rest, movement of the master switch 29 to the reverse positions causes operation of the contactors as described for acceleration from rest in the forward direction except that the contactor 19 instead of the contactor 18 closes to complete the circuits between the armatures 10a and 11a and the power conductor 13 and the field windings 10f and 11f. With the contactor 19 closed, the armatures 10a and 11a are so connected that the motors run in the reverse direction.

Plugging operations will now be described. Assuming that the motors 10 and 11 are operating in the reverse direction with the master switch 29 in any reverse position beyond the first, movement of the master switch 29 to the off position causes any of the contactors 21, 22 and 23 that were energized and the contactors 17, 19 and 26 to become deenergized. Movement of the master switch 29 into the forward positions causes immediate reclosure of the contactor 17 and immediate closure of the contactor 18. As soon as the power contacts 17a, 18a and 18b close with the motors 10 and 11 operating above a very slow speed in the reverse direction, the voltage drop across the resistor 24 is large enough to cause the relay 28 to open its contacts 28a. The contacts 28a open to interrupt the circuit to the winding 26w so soon after the control contacts 18f close that the winding 26w cannot become operatively energized. Since, with the contacts 28a open, the operating winding 26w of the contactor 26 cannot become energized to close the power contacts 26a and 26b or the control contacts 26c, the contactors 21, 22 and 23 cannot become energized to close their contacts 21a, 22a, and 23a because the contacts 26c, 21b, and 22b are open. So long as the motors 10 and 11 are operating at a material speed in the reverse direction while power is applied to the motors tending to cause them to operate in the forward direction, the relay 28 remains in its energized position and the field windings 10f and 11f remain cross-connected and stable operation of the motors results while they are being rapidly decelerated by plugging action.

When the speed of the motors 10 and 11 reaches zero, or is substantially zero, the voltage drop across the resistor 24 decreases below the drop out value of the relay 28 which thereupon closes its contacts 28a. This permits the motors 10 and 11 to be accelerated in the forward direction, and, if the master switch 29 is in the fifth forward position, for example, the contactors 26, 21, 22 and 23 close in sequence as before.

Similarly, if the master switch 29 is moved from the higher speed forward positions rapidly into the reverse positions, the plugging relay 28 responds to insure that the resistors 24 and 25 are in the circuit and that the fields 10f and 11f are cross-connected during plugging. As soon as the speed of the motors again is substantially zero, the plugging relay 28 closes its contacts 28a to permit controlled acceleration of the motors in the reverse direction.

In the controller shown in Figure 1, the plugging contactor 26 does not close when accelerating from rest until the master switch reaches the second forward or reverse position. For some applications it is desirable to have the plugging contactor close in the first master switch positions. It is obvious how this change can be made.

Although the reversing contactors 18 and 19 of Figure 1 have been shown as four-pole contactors, it is obvious that four single-pole contactors or two double-pole contactors could be used instead if desired. Similarly, two single-pole contactors could be used instead of the double-pole plugging contactor 28. It is to be noted from Figure 1 that only fourteen contactor poles are required for the control of the two motors. If separate acceleration and speed controlling rheostats were used, a minimum of seventeen and preferably eighteen contactor poles would be required. The resultant saving in space is of material advantage.

Figure 2 shows how four motors may be operated in parallel in accordance with this invention. In Figure 2, motors 41, 42, 43 and 44 have armatures 41a, 42a, 43a and 44a, respectively, and series field windings 41f, 42f, 43f, and 44f, respectively. An eight-pole forward contactor means 45 is arranged to connect the armatures for forward operation and an eight-pole reverse contactor means 46 is arranged to connect the armatures for reverse operation. An acceleration and speed control rheostat 48 having a resistor 49 and accelerating contactors 51, 52 and 53 is connected at one end to the loop circuits defined by the motors and is connected at the other end to the power source conductor 14 by a single pole contactor means 54. Plugging resistors 55, 56, 57 and 58 are arranged to be inserted into the respective armature circuits while a four-pole plugging contactor means 59 is open and to be removed from the circuits while the plugging contactor means is closed.

While the plugging contactor means 59 is open, the field 41f of the motor 41 is in series with the plugging resistor 58 and the armature 44a, the field 42f is in series with the plugging resistor 55 and the armature 41a, the field 43f is in series with the plugging resistor 56 and the armature 42a, and the field 44f is in series with plugging resistor 57 and the armature 43a. While the plugging contactor means 59 is closed, the series fields 41f, 42f, 43f, and 44f are in series with the armatures 41a, 42a, 43a, and 44a, respectively, and the resistors 55, 56, 57 and 58 are connected between substantially equipotential points. A plugging control relay similar to the relay 28 (Figure 1) may be connected across any one of the plugging resistors for controlling the operation of the plugging contactor means 59. Operation of the control system of Figure 2 can be understood from the description previously given in connection with Figure 1.

From the foregoing it is seen that there is provided an improved control system for, and a method of, controlling a plurality of parallel-connected, direct current, series or compound motors which system and method eliminate, when the motors are mechanically connected, any tendency for the motors to become unbalanced under the severe operating conditions of plugging and also while the motors are operating in the direction of their torques after the plugging contactor is closed. Thus, the only tendency for unbalance in the present system occurs when the plugging contact is open and this is at a time when the speed is generally low and operating conditions are not severe. If desired, a deceleration relay can be added which is operative when the motors 10 and 11 are running at high speed to prevent completion of the first point connections for the same direction of operation until the motors have slowed down to second point speed.

Having thus described my invention, I claim:

1. The method of operating a plurality of direct current motors each having an armature winding and an associated series field winding which method comprises connecting each armature winding in series with its associated series field winding to form a plurality of motor circuits, connecting said motor circuits in parallel with each other across a source of power to cause the motors to accelerate in the direction of their torques, and, while said motors are operating in the direction of their torques, disconnecting the motors from the source, connecting each armature winding in series with a single series field winding of one of the other motors to form a plurality of other motor circuits, and connecting said other motor circuits in parallel with each other across the source to cause the motors to exert a torque in a direction opposite to their direction of rotation.

2. The method of operating a plurality of direct current motors each having an armature winding and an associated series field winding which method comprises connecting each armature winding in series with its associated series field winding to form a plurality of motor circuits, connecting said motor circuits in parallel with each other and in series with a common resistor across a source of power to cause the motors to accelerate in the direction of their torques, and, while said motors are operating in the direction of their torques, disconnecting the motors from the source, connecting each armature winding in series with a single series field winding of one of the other motors through a plugging resistor to form a plurality of other motor circuits, and connecting said other motor circuits in parallel with each other and in series with said common resistor across the source to cause the motors to exert a torque in a direction opposite to their direction of rotation.

3. The method of operating a plurality of direct current motors each having an armature winding and an associated series field winding which method comprises connecting each armature winding in series with its associated series field winding to form a plurality of motor circuits, connecting said motor circuits in parallel with each other and in series with a common resistor in a common circuit across a source of power to cause the motors to accelerate in the direction of their torques, removing at least a part of said common resistor from the common circuit, and, while said motors are operating in the direction of their torques, disconnecting the motors from the source and connecting each armature winding in series with a single series field winding of one of the other motors through a plugging resistor to form a plurality of other motor circuits, and connecting said other motor circuits in parallel with each other through, and in series with, all of said common resistor across the source to cause the motors to exert a torque in a direction opposite to their direction of rotation.

4. The method of operating a plurality of direct current motors each having an armature winding and an associated series field winding which method comprises connecting each armature winding while the motors are at standstill in series with a single series field winding of one of the other motors through a plugging resistor to form a plurality of motor circuits, connecting said motor circuits in parallel with each other and in series with a common resistor in a common circuit across a source of power to cause the motors to accelerate from standstill in the direction of their torques, subsequently disconnecting each armature winding from the series field winding to which it has been connected, connecting each armature winding in series with its associated series field winding and rendering said plugging resistors ineffective, to form by said steps a plurality of other motor circuits, thereafter removing at least a part of said common resistor from the common circuit to cause the speed of said motors to increase, and, while said motors are opearting in the direction of their torques, disconnecting the motors from the source, reconnecting said motors in said first plurality of motor circuits, and reconnecting said first motor circuits in parallel with each other and in series with all of said common resistor across the source to cause the motors to exert a torque in a direction opposite to their direction of rotation.

5. A control system and motor combination comprising a plurality of direct current motors each having an armature winding and an associated series field winding, switch means operable to connect each armature winding in series with its associated series field winding to form a plurality of motor circuits respective to the motors, means operable to connect said motor circuits in parallel with each other across a source of power for causing all of the motors to exert torque concurrently in the forward direction and concurrently in the reverse direction, selectively, whereby the motors accelerate and run in the direction of their torques, and said switch means being operable while the motors are running to connect the armature winding of each motor in series with a single series field winding of another one of the motors to form a plurality of other motor circuits, and said second mentioned means being operable to connect said other motor circuits in parallel with each other across the source to cause all of the motors to exert torque opposite to the direction of rotation.

6. The control system and motor conbination of claim 5 characterized in that a common resistor is interposed in series with all of said motor circuits and all of said other motor circuits when said circuits are connected to said source.

7. The control system and motor combination of claim 6 characterized in that means are provided for short circuiting said resistor.

8. The control system and motor combination of claim 5 characterized in that resistors are interposed in said other motor circuits, respectively.

9. The control system and motor combination of claim 5 characterized in that said motors are coupled for rotation in substantially fixed relation to each other.

10. The control system and motor combination of claim 5 characterized in that said switch means includes a pair of reversing contactors and a plugging contactor so interconnected with each other and with said motors that closure of said plugging contactor with one of said reversing contactors closed connects each armature winding in series with its associated series field winding, and that opening of said plugging contactor with one of said reversing contactors closed connects the armature winding of each motor in series with a single series field winding of another one of the motors.

No references cited.